(12) United States Patent
Benco et al.

(10) Patent No.: US 7,801,525 B2
(45) Date of Patent: Sep. 21, 2010

(54) NETWORK SUPPORT FOR PAGING CHANNEL AND ACCESS CHANNEL OPTIMIZATION

(75) Inventors: David S. Benco, Winfield, IL (US);
Karen Lee Redell, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 665 days.

(21) Appl. No.: 11/090,500

(22) Filed: Mar. 25, 2005

(65) Prior Publication Data

US 2006/0217118 A1   Sep. 28, 2006

(51) Int. Cl.
*H04W 4/00* (2009.01)
*H04W 68/00* (2009.01)
*H04W 40/00* (2009.01)

(52) U.S. Cl. ............... 455/435.1; 455/458; 455/434; 455/449

(58) Field of Classification Search .......... 455/435.1, 455/458, 434, 456.1
See application file for complete search history.

(56) References Cited

U.S. PATENT DOCUMENTS

| | | | | |
|---|---|---|---|---|
| 5,369,681 | A * | 11/1994 | Boudreau et al. | 455/456.1 |
| 6,035,203 | A * | 3/2000 | Hanson | 455/458 |
| 6,236,861 | B1 * | 5/2001 | Naor et al. | 455/458 |
| 6,535,745 | B1 * | 3/2003 | Seraj | 455/458 |
| 6,549,775 | B2 * | 4/2003 | Ushiki et al. | 455/432.1 |
| 7,076,258 | B2 * | 7/2006 | Motegi et al. | 455/456.1 |
| 7,142,879 | B2 * | 11/2006 | Watanabe et al. | 455/458 |
| 7,171,219 | B2 * | 1/2007 | Hu | 455/456.5 |
| 2001/0012779 | A1 * | 8/2001 | Skog | 455/436 |
| 2004/0176113 | A1 * | 9/2004 | Chen et al. | 455/458 |
| 2004/0203894 | A1 * | 10/2004 | Watanabe et al. | 455/456.1 |
| 2005/0070283 | A1 * | 3/2005 | Hashimoto et al. | 455/435.1 |
| 2005/0090251 | A1 * | 4/2005 | Kuchibhotla et al. | 455/435.1 |

OTHER PUBLICATIONS

Jie Li Yi Pan Xiahua Jia, Mar. 2001, ACM Press, pp. 1 and 2.*

* cited by examiner

*Primary Examiner*—George Eng
*Assistant Examiner*—Christopher M Brandt
(74) *Attorney, Agent, or Firm*—Fay Sharpe LLP

(57) ABSTRACT

A method for conserving paging and access channel bandwidth is provided in a wireless network (A) that includes: a plurality of cells (32) served by a mobile switching center (20); a paging channel for paging a mobile station (MS) (40) located within the cells (32); and, an access channel by which the MS (40) registers with the network (A). The method includes: defining a first set of location areas (LAs) including a plurality of paging LAs (50), each paging LA (50) including a plurality of cells (32); and, defining a second set of LAs including a plurality of registration LAs (60), each registration LA (60) including a plurality of paging LAs (50). As the MS travels, it registers with the network when entering one registration LA (60) from another, but it does not register when entering one paging LA (50) from another within the same registration LA (60).

18 Claims, 2 Drawing Sheets

NETWORK SUPPORT FOR PAGING CHANNEL AND ACCESS CHANNEL OPTIMIZATION

FIELD

The present inventive subject matter relates to the wireless or mobile telecommunications arts. Particular application is found in conjunction with paging a mobile station (MS), and the specification makes particular reference thereto. However, it is to be appreciated that aspects of the present inventive subject matter are also amenable to other like applications.

BACKGROUND

Wireless or mobile telecommunications networks are generally known in the art. A MS (e.g., a mobile telephone or other mobile or wireless end user device) obtains service and/or access to the wireless network via an over-the-air radio frequency interface with a base station (BS). Each BS provides the over-the-air interface for and/or serves a particular geographic coverage area known as a cell. Typically, a plurality of base stations are operatively connected to and/or served by a mobile switching center (MSC) that is responsible for routing traffic for a particular MS to the appropriate BS currently serving that MS (i.e., to the cell in which the MS is currently located).

The "mobility" in mobile communications is commonly achieved in part via two communication channels between the BS and MS, namely, a paging channel and an access channel. The paging channel is used to verify and/or establish the location of the MS within the network and to deliver incoming calls to the MS. The access channel is used by the MS for registration purposes, i.e., to report power-up of the MS, to report changes in the location of the MS, etc.

Typically, a mobile service provider seeks to maximize the number of busy hour call attempts (BHCA) in order to serve an increasing number of mobile subscribers. One obstacle to achieving this goal, however, is the availability of sufficient paging channel bandwidth. While there are known ways to increase paging capacity, they often involve considerable expense and/or lead time, e.g., adding new bandwidth. Accordingly, it is desirable to optimize the usage of existing paging channel bandwidth.

Historically, when an incoming call arrived at a MSC for a MS, all the cells in the entire MSC would be paged in order to contact the MS and deliver the call. That is to say, the MSC would signal all the base stations it served to transmit a paging signal over their paging channels to verify or establish the location of the MS within one of the cells. This approach, however, used a considerable amount of paging channel bandwidth insomuch as all the cells within the geographic region served by the MSC where paged for any given instance.

A recent development is to partition the cells served by the MSC into a plurality of zones, i.e., groups of neighboring cells known as location areas (LAs), and begin paging only those cells in the last known LA of the MS being sought. While this reduces the load on the paging channel because fewer cells are instructed to page the MS for any given instance, the load on the access channel increases because registration messages are sent by the MS to the MSC every time an LA boundary is crossed. That is to say, in order for the MSC to know which LA the MS is in at any given time, the MS signals the MSC using the access channel each time it enters a new LA. Smaller LAs in turn mean that the LA boundaries are closer to one another, which in turn means that as a mobile subscriber travels they are more likely to cross more boundaries. Accordingly, increasing the number of LAs per MSC reduces the size of each LA and the load on the paging channel, but at the expense of increasing the load on the access channel. Service providers have found that creating more than a few LAs per MSC results in access channel overload. However, there remains the desire to reduce the paging channel load in order to support more mobiles and/or more services.

Accordingly, a new and improved MSC partitioning system and/or method for a wireless telecommunications network is disclosed that overcomes the above-referenced problems and others.

SUMMARY

In accordance with one embodiment, a method for conserving paging channel and access channel bandwidth is provided in a wireless telecommunications network. The network includes: a plurality of cells served by a mobile switching center and including a paging channel for paging a mobile station located within the cells and an access channel by which the mobile station registers its location with the network. The method includes: defining a first set of location areas including a plurality of paging location areas, each paging location area including a plurality of cells; and, defining a second set of location areas including a plurality of registration location areas, each registration location area including a plurality of paging location areas. As the mobile station travels, it registers via the access channel when entering one registration location area from another registration location area, but it does not register via the access channel when entering one paging location area from another paging location area within the same registration location area.

In accordance with another aspect, a wireless telecommunications network includes: a plurality of base stations defining a corresponding plurality of cells, the cells being partitioned into a first set of location areas and a second set of locations areas, the first set of location areas including a plurality of paging location areas each having a plurality of cells therein, and the second set of location areas including a plurality of registration location areas each having a plurality of paging location areas therein; a paging channel for paging a mobile station located within the cells; and, an access channel by which the mobile station registers its location with the network, wherein the mobile station registers via the access channel when entering one registration location area from another registration location area and does not register via the access channel when entering one paging location area from another paging location area within the same registration location area.

Numerous advantages and benefits of the inventive subject matter disclosed herein will become apparent to those of ordinary skill in the art upon reading and understanding the present specification.

BRIEF DESCRIPTION OF THE DRAWINGS

The present inventive subject matter may take form in various components and arrangements of components, and in various steps and arrangements of steps. The drawings are only for purposes of illustrating example embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components and features that are commonly known in the telecommunications art without further detailed explanation as to their configuration or operation except to the extent they have been modified or altered in accordance with and/or to accommodate the embodiment(s) presented herein.

Figure 1:
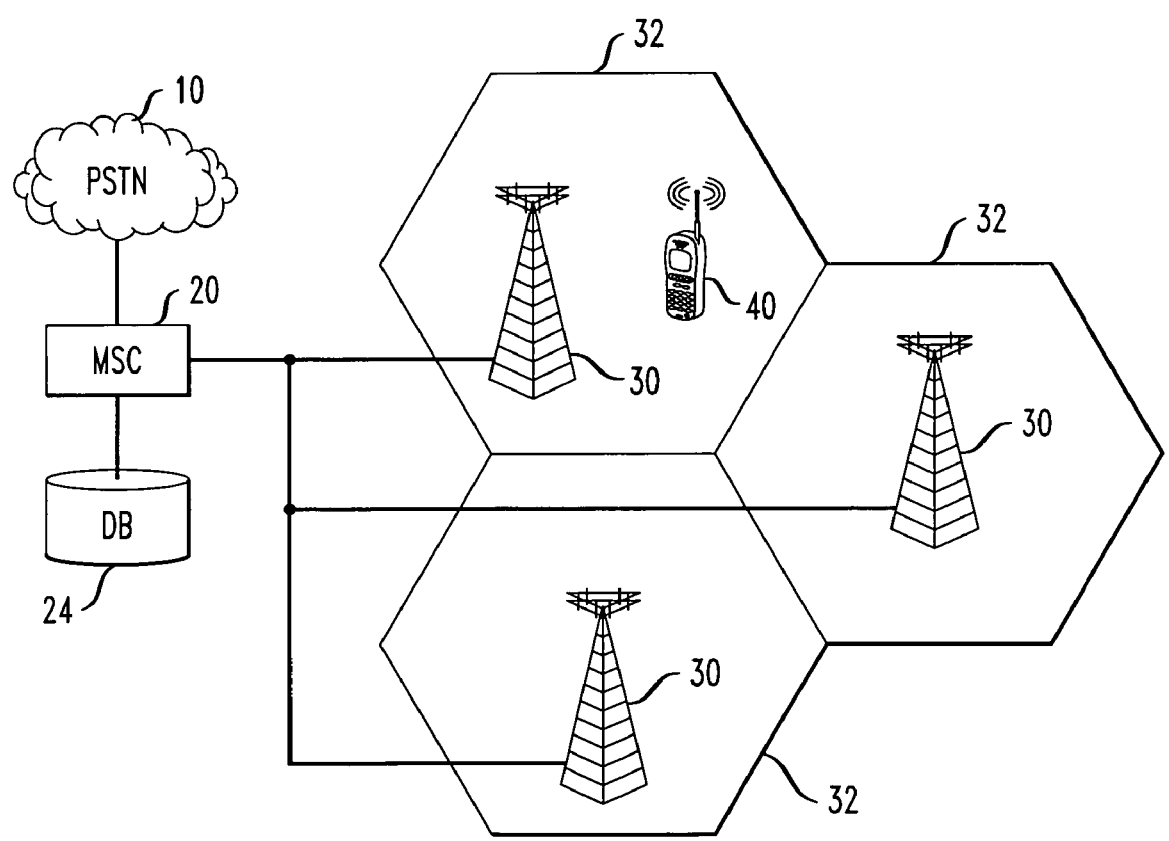
FIG. 1 is a diagram illustrating a telecommunications network suitable for practicing aspects of the present inventive subject matter.

With reference to FIG. 1, a telecommunications network A includes a public switched telephone network 10 operatively connected to and/or in communication with a MSC 20 in the usual manner. The MSC 20 is operatively connected to and/or in communication with a plurality of base stations 30 in the usual manner. As is understood in the art, each BS 30 provides an over-the-air radio frequency interface for its respective geographic area or cell 32. Selectively, a MS (such as the exemplary MS 40 illustrated) is provided telecommunication services and/or otherwise accesses the network A via the interface and/or BS 30 serving the cell 32 in which the MS 40 is located. In the usual manner two communication channels are selectively employed between the BS 30 and MS 40, namely, a paging channel and an access channel. The paging channel is used to verify and/or establish the location of the MS 40 within the network A and to deliver incoming calls to the MS 40. The access channel is used by the MS 40 for registration purposes, i.e., to report power-up of the MS 40, to report changes in the location of the MS 40, etc.

While only one MSC is illustrated in FIG. 1 for purposes of simplification and clarity, it is to be appreciated that the network A may in fact include any number of one or more MSCs that are similarly situated and/or arranged. Additionally, while three BS 30 and three corresponding cells 32 are illustrated in FIG. 1, it is to be appreciated that more or less than three base stations and/or cells may be similarly situated with respect to any of the one or more MSCs in the network A. That is to say, each MSC in the network A may optionally serve any number of one or more base stations and/or corresponding cells. Additionally, while only one exemplary MS is illustrated in FIG. 1, the network A optionally serves any number of one or more mobile stations similarly situated and/or arranged in any of the one or more cells 32.

Figure 2:
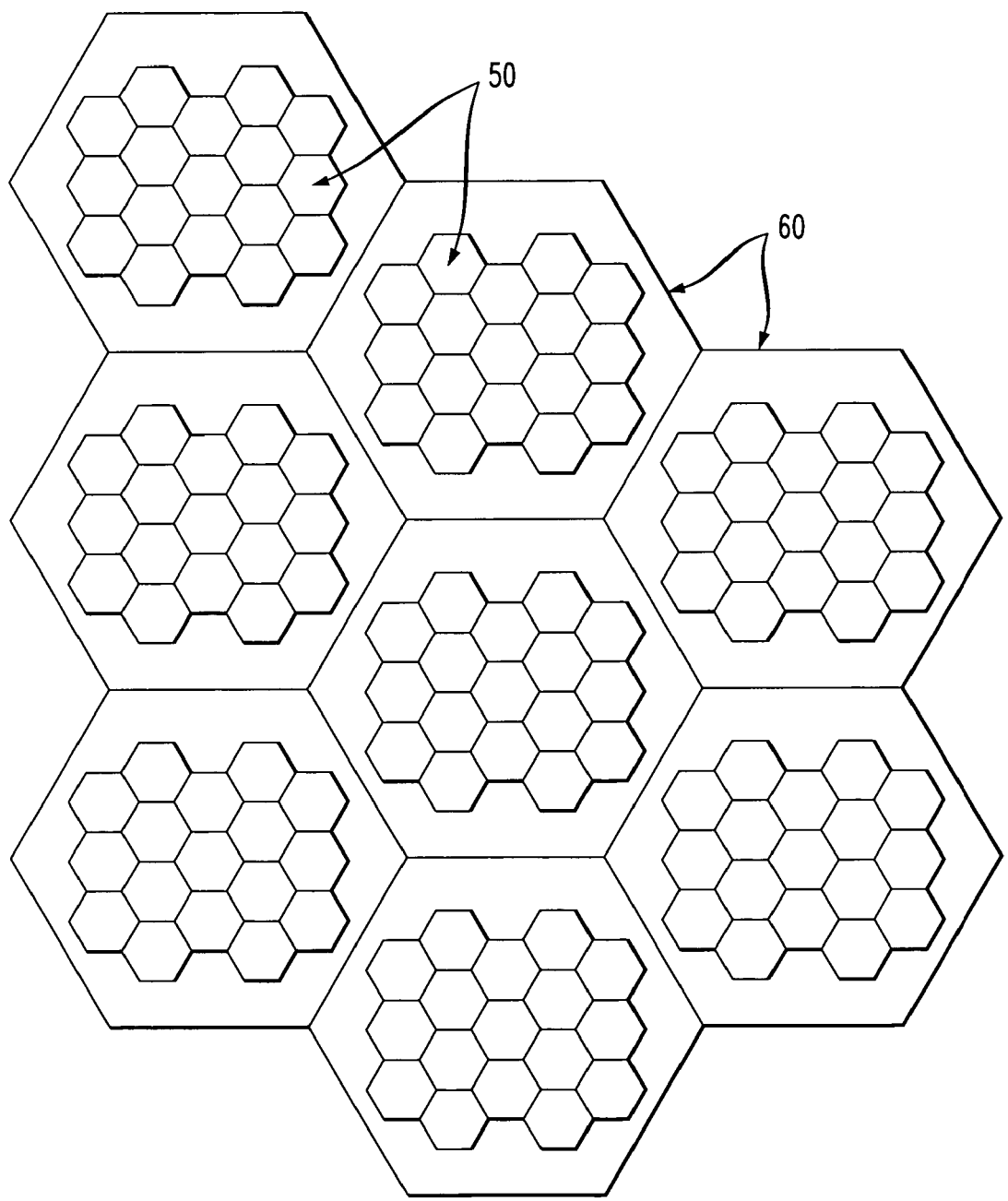
FIG. 2 is a diagram illustrating an exemplary MSC partitioning that embodies aspects of the present inventive subject matter.

With reference to FIG. 2, the cells 32 and/or geographic area served by the MSC 20 are zoned or partitioned in two different ways, i.e., into paging LAs 50 and registration LAs 60. In the usual manner, each paging LA 50 includes a plurality of cells 32. The registration LAs 60, however, are generally larger than the paging LAs 50. Suitably, each registration LA 60 includes a plurality of paging LAs 50. As can be appreciated, unlike the traditional partitioning of an MSC having one set of LAs (i.e., the same set of LAs used for both paging and registration), the partitioning illustrated in FIG. 2 has two sets of different LAs, namely, the set of relatively larger registration LAs 60 used for registration, and the set of relatively smaller paging LAs 50 used for paging. Accordingly, the larger registration LAs 60 result in relatively less frequent registration of traveling mobile stations and hence a reduced load on the access channel, while the smaller paging LAs 50 result in relatively fewer cells 32 being paged for a given instance and hence a reduced load on the paging channel.

For example, as the MS 40 travels, it registers its current location with the MSC 20 each time it enters a new registration LA 60, i.e., each time it crosses from one registration LA 60 into the next or each time it crosses a registration LA boundary. For example, the MS 40 registers with the MSC 20 serving its location by sending a registration signal to the MSC 20 using the access channel. In this manner, the MSC 20 is able to remember the most recent registration LA 60 from which the MS 40 registered. For example, the MSC 20 may store the last known registration information (including, e.g., the identity of the registration LA 60 from which the MS 40 last registered) in a location register or database 24 (see FIG. 1). A time and/or date stamp for each of these registrations is also optionally maintained in the database 24. In this manner, it can be determined how old the last registration is for the particular MS 40. Suitably, registration does not take place when the MS 40 crosses from one paging LA 50 to the next within the same registration LA 60.

In addition to the last or most recent registration LA 60 from which MS 40 registered, the last or most recent cell 32 accessed by the MS 40 is also monitored by the network A, and mapped to the paging LA 50 containing that cell 32. The identity of this last known paging LA 50 is optionally stored or maintained along with and/or as part of the information in the database 24. Cell access events include those events where the MS 40 accesses a cell 32, i.e., the MS 40 sends, receives or otherwise exchanges a transmission to, from or with a BS 30. For example, a cell access event may include, registration of the MS 40, the MS 40 receiving an incoming call, the MS 40 placing an outgoing call, the transmission of packet data to or from the MS 40, short-message-service (SMS) receipt or transmittal, etc. For each of these activities, the network A is able to determine which BS 30 and/or cell 32 the MS 40 is using. Suitably, this cell location and/or identity is mapped to its corresponding paging LA 50 that is in turn captured and/or updated at each cell access event, e.g., by the MSC 20. A time and/or date stamp for each of these captures and/or updates is also optionally maintained in the database 24. In this manner, it can be determined how old the identity of the last known paging LA 50 is for the particular MS 40.

Suitably, when the MS 40 is being sought by the network A (e.g., when an incoming call arrives at the MSC 20 for the MS 40), an appropriate page is sent out for the MS 40 over the paging channel using a paging protocol that depends upon the information stored in the location register or database 24. Depending upon if and/or when the page is answered, multiple pages may be attempted.

For example, in a first paging attempt, if the last registration stored in the database 24 is more recent than a defined threshold, then the MS 40 is more likely to be in or near the paging LA 50 it entered when it entered the current registration LA 60, otherwise if the last registration stored in the database 24 is older than the defined threshold, then the MS 40 is less likely to be in or near the paging LA 50 it entered when it entered the current registration LA 60. That is to say, if the MS 40 had recently registered (i.e., crossed a registration boundary), then there is a certain level of confidence that the MS 40 is still in or near the cell 32 it used to register (i.e., within that corresponding paging LA 50). Conversely, if the MS 40 had not recently registered, then that level of confidence is somewhat lower. The paging protocol is therefore tailored accordingly. For example, if the MS 40 is deemed to have registered relatively recently (i.e., within the threshold), then the first paging attempt is merely sent out to the last known paging LA 50 stored in the database 24, and optionally, if the MS 40 is deemed to have registered relatively long ago (i.e., outside the threshold), then the first paging attempt may be sent out to some larger area, e.g., the entire last known registration LA 60 stored in the database 24. In this way, a wider area can be automatically paged for a more mobile MS 40, while conserving both paging and access channel resources. Of course, if the MS 40 does not respond to the first paging attempt, a second attempted may be made, suitably scaled-up as appropriate, e.g., using a corresponding LA cluster (LAC) which includes the target LA plus all its neighboring LAs. For example, in the case of a recently registered MS 40, the second page may go out to the last known paging LA 50 plus all its neighboring paging LAs 50, while in the case of a relatively older registered MS 40, the second page may go out to the last known registration LA 60 plus all its neighboring registration LAs 60.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In a wireless telecommunications network comprising a plurality of cells served by a mobile switching center and including a paging channel for paging a mobile station located within the cells and an access channel by which the mobile station registers its location with the network, a method for conserving paging channel and access channel bandwidth, said method comprising:
   (a) defining a first set of location areas including a plurality of paging location areas, each paging location area including a plurality of cells; and,
   (b) defining a second set of location areas including a plurality of registration location areas, each registration location area including a plurality of the plurality of paging location areas;
   wherein the mobile station registers via the access channel when entering one registration location area from another registration location area and does not register via the access channel when entering one paging location area from another paging location area within the same registration location area.

2. The method of claim 1, wherein the plurality of cells within a paging location area are neighboring cells and the plurality of paging location areas within a registration location area are neighboring paging location areas.

3. The method of claim 1, further comprising:
   remembering when the mobile station last registered with the network.

4. The method of claim 3, further comprising:
   determining for the mobile station a location confidence value based upon how long ago the mobile station last registered with the network; and,
   paging the mobile station within a paging area whose size depends upon the determined location confidence value for the mobile station.

5. The method of claim 4, wherein the location confidence value is determined to be a first value if the last remembered registration is not older than a defined threshold and a second value if the last remembered registration is older than the defined threshold.

6. The method of claim 5, wherein the paging area is smaller when the location confidence value for the mobile station is the first value as compared to when the location confidence value for the mobile station is the second value.

7. The method of claim 6, further comprising:
   remembering the cell that the mobile station last used to connect with the network.

8. The method of claim 7, wherein when the location confidence value for the mobile station is the first value the paging area is the paging location area including the remembered cell that the mobile station last used to connect with the network.

9. The method of claim 7, wherein when the location confidence value for mobile station is the second value the paging area is the registration location area including the remembered cell that the mobile station last used to connect with the network.

10. A wireless telecommunications network comprising:
    a plurality of base stations defining a corresponding plurality of cells, said cells being partitioned into a first set of location areas and a second set of locations areas, the first set of location areas including a plurality of paging location areas each having a plurality of cells therein, and the second set of location areas including a plurality of registration location areas each having a plurality of the plurality of paging location areas therein;
    a paging channel for paging a mobile station located within the cells; and,
    an access channel by which the mobile station registers its location with the network, wherein the mobile station registers via the access channel when entering one registration location area from another registration location area and does not register via the access channel when entering one paging location area from another paging location area within the same registration location area.

11. The network of claim 10, wherein the plurality of cells within a paging location area are neighboring cells and the plurality of paging location areas within a registration location area are neighboring paging location areas.

12. The network of claim 10, further comprising:
    a database that stores when the mobile station last registered with the network.

13. The network of claim 12, wherein the mobile station is assigned a location confidence value based upon how long ago the mobile station last registered with the network, and the paging channel is used to page the mobile station within a paging area whose size depends upon the assigned value for the mobile station.

14. The network of claim 13, wherein a first value is assigned if the last remembered registration is not older than a defined threshold and a second value is assigned if the last remembered registration is older than the defined threshold.

15. The network of claim 14, wherein the paging area is smaller when the mobile station is assigned the first value as compared to when the mobile station is assigned the second value.

16. The network of claim 15, wherein an identity of the cell that the mobile station last used to connect with the network is also stored in the database.

17. The network of claim 16, wherein when the mobile station is assigned the first value the paging area is the paging location area including the cell that the mobile station last used to connect with the network.

18. The network of claim 16, wherein when the mobile station is assigned the second value the paging area is the registration location area including the cell that the mobile station last used to connect with the network.

* * * * *